Jan. 19, 1943.    P. CURRY    2,309,048
COLOR CORRECTING METHOD AND DEVICE
Filed March 13, 1941    2 Sheets-Sheet 1

PAUL CURRY
INVENTOR
BY
ATTORNEY

Jan. 19, 1943.  P. CURRY  2,309,048
COLOR CORRECTING METHOD AND DEVICE
Filed March 13, 1941  2 Sheets-Sheet 2

FIG. 3  FIG. 4

PAUL CURRY
INVENTOR

BY Robert E. Woodhams
ATTORNEY

Patented Jan. 19, 1943

2,309,048

UNITED STATES PATENT OFFICE 2,309,048

COLOR CORRECTING METHOD AND DEVICE

Paul Curry, Kalamazoo, Mich.

Application March 13, 1941, Serial No. 383,114

14 Claims. (Cl. 178—5.2)

This invention relates to photography and particularly to the part thereof involved in the making of properly corrected color separation negatives from colored transparencies.

There are many processes for making color prints, either upon photographic paper or in the photoengraving art, but the most usable of commercially applicable processes involves the preparation of either three or four negatives, according to the process used, which negatives are made so that one negative represents each of the following color characteristics in the transparency: red, green, blue and gray. Gray, however, is sometimes omitted. From each of these negatives there is made a part of a photographic print, or else there may be made a photoengraving plate, depending upon the ultimate purpose desired.

However, because of the discrepancies in color responding capacity of the articles appearing in nature which are photographed, the dyes used in the transparencies, the dyes used in photographic printing and the inks used in book or magazine printing of color pictures, there must always be a considerable amount of toning of each separation negative to accommodate it to the above discrepancies, in order that the final result shall present a picture to which the eye will react in about the same way that it would to the original scene in nature.

This toning is done in presently practiced methods by a complex system of masking. This comprises printing along with the negative representing one selected color, a weak positive bound into register with said negative and which positive represents the complementary color of the said negative in order to obtain a corrected positive print of the said selected color. By this manipulation, and others similar, the printing strength of a particular color in the positive print may be built up or toned down as desired to correct for the above mentioned discrepancies.

However, this correction by masking involves many difficulties, among the most prominent of which is the inherent mechanical difficulty of printing through two transparencies at the same time and the fact that the masks can never be made by definite analysis but must always be made solely according to the best guess of the operator. It has been found that this process frequently requires that many trial maskings be made before a wholly satisfactory one can be obtained and, hence, is extremely wasteful.

Therefore, it becomes desirable to find a method by which this color correcting may be made in a positive and definite manner and which is subject to definite mathematical control. I have invented such a method, and herewith disclose the same together with apparatus for practicing the same. By the use of this method, much waste of time and materials may be avoided, and the results will always be subject to a precise control.

There has also appeared, in the art of color printing wherein the exposure of the negative is effected by a scanning beam as well as in other arts, such as television, wherein a picture is made on a surface by a scanning beam, the problem of causing said beam to scan the surface without the production of pattern. In the conventional methods for directing the operation of a scanning beam, the said beam is caused to scan the object in a series of parallel paths. This, in most applications, is only reasonably satisfactory because, inevitably, there will appear in the finished product a pattern made by said series of parallel paths. Hence, it is desirable to find a method of operating a scanning beam which will produce a picture without the production of pattern.

Thus, the principal object of my invention is to provide a method, and apparatus to carry out said method, by which color corrections in the photographic printing of colored transparencies may be made quickly, easily and positively.

Another object of my invention is to effect the above named purpose by means of a process which is subject to definite control throughout the proceedings.

Another object of my invention is to provide a process for effecting the above named desirable ends which will eliminate the now frequently expensive and time consuming trial and error system of masking.

Another object of my invention is to provide a process for photographic copying which will be accurate and speedy, and will render both colors and intensities accurately.

Another object of my invention is to provide a means for photoelectric analysis of colors and of intensities which will automatically, but subject to the operator's control, effect such color and intensity corrections as may be desirable.

Another object of my invention is to provide a means for photoelectric analysis of colors and intensities which will cover smoothly the entire transparency which is being copied.

A further object of the invention hereinafter disclosed is to provide a method by which a scanning beam may scan a surface for the production of a picture thereon, which scanning is done without the production of visible pattern in the finished picture.

Accordingly, my invention consists of the method hereinafter described together with the apparatus hereinafter described and disclosed by which the said method may be practiced. However, it should be clearly understood that the use of my method is not at all limited to the apparatus hereinafter disclosed, but may be practiced by means of various different kinds of apparatus. Suggestions for such different kinds of apparatus by which my said method may be practiced will appear at various appropriate places in the following specification.

Figures 1, 2:
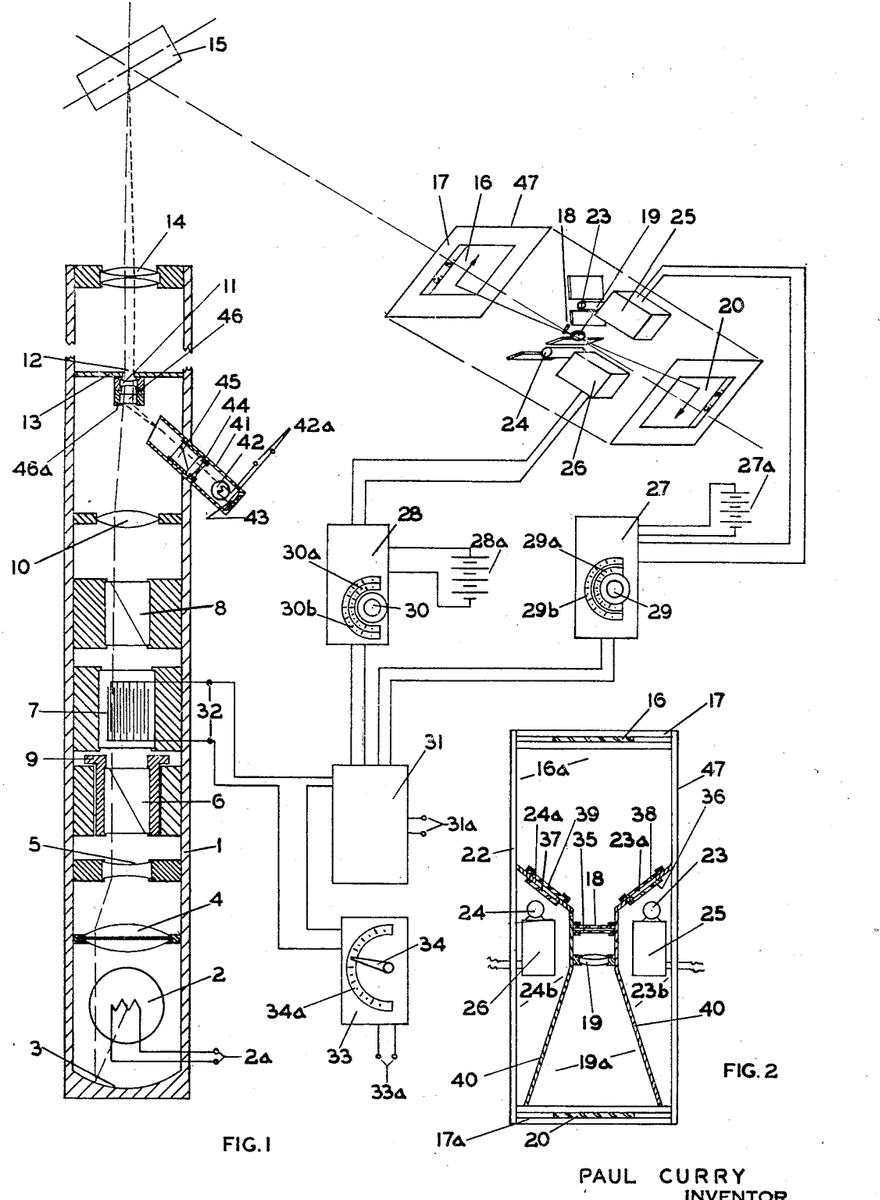
Figure 1 illustrates diagrammatically an apparatus by which my method may preferably be practiced.
Figure 2 illustrates diagrammatically, on a somewhat larger scale, a top view of the analyzing box.

Briefly, my invention, in the form of Figures 1 and 2, contemplates causing a narrow beam of light which is subject to instantaneous control in its intensity, to scan all portions, but to illuminate at any one instant only a small spot, of the transparency which is being copied, thence to cause light emanating from said illuminated spot to fall upon the separation negative which is being made and thus to expose the same in a corresponding small spot according to the characteristics received from the transparency; to analyze simultaneously selected color and/or intensity characteristics of the transparency being copied by an independently but concurrently acting beam of light by causing the same to fall upon the said transparency in the same spot as the first above named beam, to pass through the same and thence to fall upon a light sensitive means which is operatively connected with means to control within predetermined ultimate limits the intensity of the original beam in a substantially instantaneous manner. In this way, light emanating from the transparency may be instantly analyzed and corrected according to the correction required by the above mentioned variations in inks and caused to expose the separation negative in the manner as corrected to give the same result which is now laboriously obtained by masking. While I am herein disclosing an apparatus which will be effective for practicing this process, there are many others available and at various places in the hereinafter following disclosure, I will specifically point out certain of them.

Although, as indicated above, my invention is primarily in a process, it may be most easily understood by referring to a specific apparatus for using it and, accordingly, I will explain the construction of the said apparatus and its operation before considering further the said process.

Referring now to the drawings, in Figures 1 and 2 the tubes 1 and 41, and their contents, provide independent sources of brilliant illumination on a small area, and the illumination provided by source 1 is subject to control in intensity by electrical means. This control being electrical, and the subject matter controlled being light waves, all processes later described will obviously be for all practical purposes instantaneous. The analyzing box 47 contains the transparency being copied, the analyzing mechanism and the separation negative which is being made.

Referring now to the drawings in more detail, there is shown at 1 a light-tight tube of any convenient material and construction. At one end thereof there is located a parabolic concave mirror 3 and, properly spaced from said mirror, a light source 2 which is provided with electrical connecting terminals 2—a. At 4 is located a standard gathering lens for concentrating light rays onto a lens 5, which is concave and designed to direct said rays in parallel manner upon a Nichol prism located at 6. This prism is arranged for rotating adjustment, as by knob 9, of its plane of polarization but it is normally set to polarize light in a horizontal plane. At 7 there is located a standard Kerr cell having terminals 32, such as is common in television practice, and which is adapted to rotate enough of the light waves from horizontal vibrations to vibrations between horizontal and vertical so that the net effect is to make the vector diagram of the vibrations change in shape from plane to elliptical, wherein the minor axis of the ellipse varies directly and instantly according to the magnitude of the potential imposed across the terminals of the Kerr cell at 32. At 8 there is located another Nichol prism which is arranged with its plane of polarization set at vertical. Obviously, the greater the potential at terminals 32, the more light will be turned by the Kerr cell into a vertical plane of vibration and hence the more will pass through prism 8. Thus the light passing out of prism 8 varies directly with the potential imposed at terminals 32. It has been found that with potentials ranging from 375 volts to 525 volts, the variation is substantially a straight line relationship.

The foregoing described structure is merely a suggestion for one available form of light valve which will control the light emitted therefrom instantaneously according to the variations in electrical potential imposed across the terminals 32 of the Kerr cell. Obviously, any other form of light valve could be substituted for this structure without altering the invented process, for example, recent developments in cathode ray tubes as particularly developed in the field of television would suggest several forms of light valves, which, when properly color corrected by filters, could readily be used in place of the foregoing described apparatus.

At 10 is a concentrating lens for focusing the polarized light from Nichol prism 8 onto the concave lens at 11. The lens at 46 is rectangular and has its face 46—a set perpendicularly to the axis of tube 1 so that light rays from source 2 will pass through it substantially unaffected. Lens 11 makes parallel the light rays from lens 10. At 13 there is an opaque screen having aperture 12 therein through which the light from lens 11 passes to provide a source of intense, concentrated, vertically polarized light. This is gathered by anastigmatic lens 14 and directed toward mirror 15 at the point of intersection of its three mutually perpendicular axes of rotation hereinafter mentioned in detail. This light beam is hereinafter referred to as the "exposing beam."

At 41 there is another similar but smaller light-tight tube which is likewise made of convenient material and in convenient size. It is located in the side of tube 1 with its axis intersecting the center of face 46—a of lens 46. It contains, mounted in any convenient manner, light source 42, parabolic concave mirror 43, concave straightening lens 44, and Nichol prism 45. This prism is arranged to polarize the light from source 42 in a horizontal plane relative to the vertical plane of prism 8.

The angle of incidence of light rays from tube 41 upon lens 46 is determined by the characteristics of the material used for said lens, and is part of the presently known art. It is arranged to bend the light rays from tube 41 to a direction coincident with the axis of tube 1. These rays then similarly to the rays from source 2, emerge from aperture 12 as a small spot of bright light but here horizontally polarized, and as such are directed by lens 14 toward the above mentioned intersection of axes of mirror 15. This light beam is hereinafter frequently referred to as the "pilot beam."

At 47 there is indicated the exposing and analyzing box. This is made of any convenient materials, and is preferably arranged in light-tight relationship to tube 1, although the same effect may be secured by using the apparatus in a darkroom. At one end of said box 47 there is a frame 17 adaptable for holding an ordinary transparency, such as Eastman Kodachrome, which is indicated at 16. At the other end of said box, there is located another frame 17—a which is adaptable for holding the negative 20 which is to be the separation negative made by this apparatus from the transparency at 16. Lens 19 is of standard form and is located to focus light emanating from any point on transparency 16 as a source sharply upon a corresponding point of negative 20. Aperture 12, lens 14, mirror 15 and transparency 16 are all located with respect to each other so that the bright spot source of light at aperture 12 will be focused sharply as a real image upon transparency 16, by which transparency 16 will act as a light source to be focused onto negative 20. By making the focal length of lens 14 long with respect to the width and height of transparency 16, the arc made with mirror 15 as its center is made substantially a straight line so that the light beam is always in focus on transparency 16.

Interposed in front of lens 19 is filter 18, which is any standard color filter, and which is placed in a convenient holding frame. At 35, immediately behind filter 18, there is affixed a screen arranged to pass only vertically polarized light and to bar all other light. At 23 and 24 on either side of the lens 19 in chambers 23—b and 24—b formed by partitions 40, there are located light sensitive means such as standard photoelectric cells and their accompanying standard pre-amplifiers 25 and 26 respectively. These pre-amplifiers must obviously be provided with a source of power but this is not shown in the drawing.

The photoelectric cell is connected to its pre-amplifier in such a manner that when the said cells are unactivated, the current flows out of the pre-amplifier at a maximum intensity, and as the said cells become activated the current flowing from the pre-amplifier is proportionately decreased. Such circuits are well known to the present art and hence none needs to be detailed here. However, as an example of such, it may be suggested that with the type of photoelectric cell which develops a potential upon being activated, the cell may be connected to the amplifying section of the pre-amplifier with reversed polarity or, with the type of cell which upon being activated lessens its electrical resistance, the same may be connected with a source of potential to supply a supplementary potential to the grid of the pre-amplifier tube.

In front of these photoelectric cells 23 and 24 are located apertures 23—a and 24—a, respectively, behind which are placed polarizing screens 36 and 37, respectively, which are both constructed to pass only horizontally polarized light. Color filters 38 and 39 are conveniently placed closely in front of said apertures in any holder from which they may readily be withdrawn. The entire analyzing box 47 is obviously arranged so that light may enter chamber 16—a only through transparency 16, may enter chambers 23—b and 24—b only through apertures 23—a and 24—a, respectively, and light may enter chamber 19—a only through lens 19.

At 27 and 28 are indicated standard direct current amplifiers of any of several familiar kinds suitable for modulating the final amplifier of a Kerr cell. These are provided with a source of potential, as 27—a and 28—a. There are also controls 29 and 30, respectively, which will operate to vary the magnitude of current output by any standard means. Dials 29—a, 29—b, 30—a and 30—b may be calibrated to control the current output with each dial representing a particular color relationship.

At 31 there is indicated a final stage amplifier for direct current of any known type suitable for modulating a Kerr cell and having an output range of 375 to 525 volts, which is the range of voltages through which the Kerr cell and Nichol prisms will give a light transmission ratio in straight-line relationship to the applied voltages. At 33 there is indicated a source of further potential, having the same range and controlled by indicator 34 on dial 34—a, which is imposed independently of the potential from amplifier 31. The sum of these potentials is seen to be imposed across the terminals 32 of the Kerr cell 7.

Figures 3, 4:
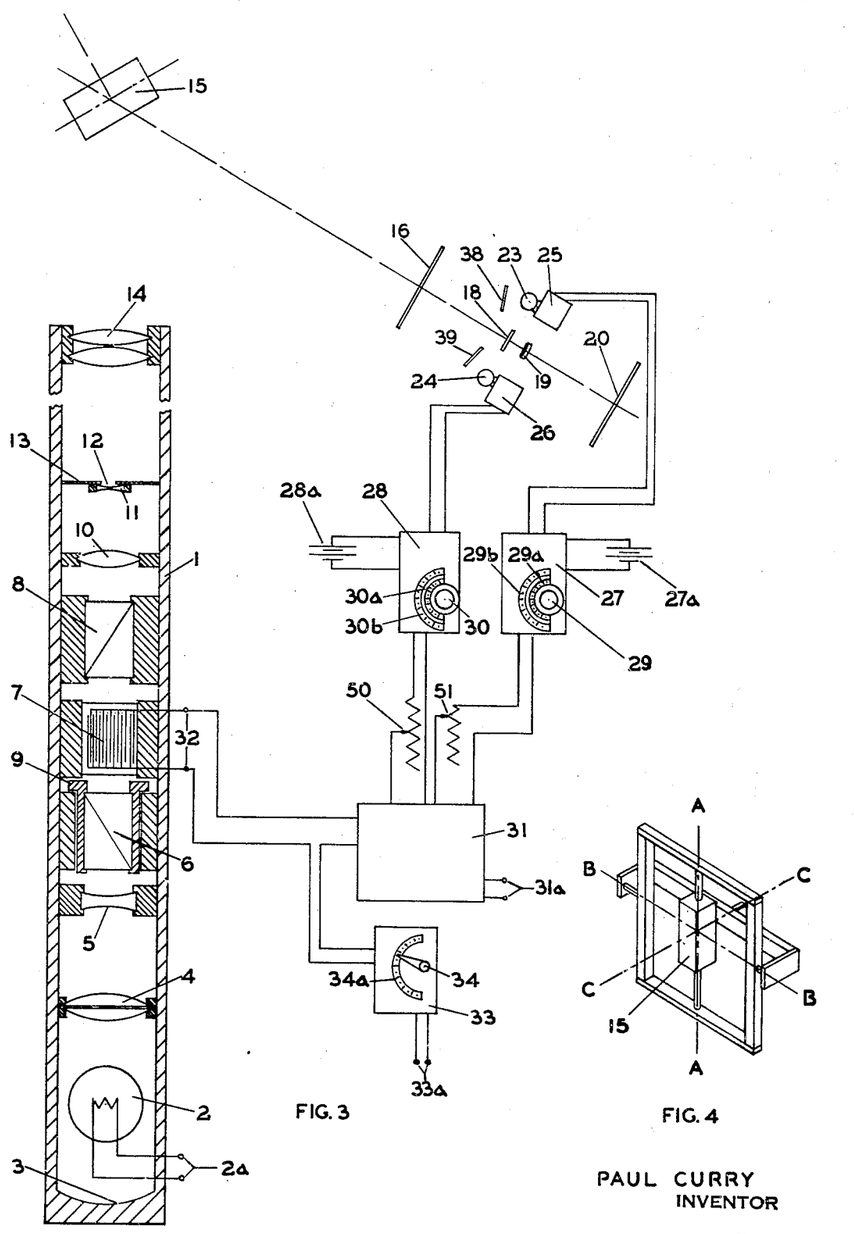
Figure 3 illustrates diagrammatically a modified form of said apparatus.
Figure 4 illustrates the manner of mounting the mirror.

Referring now to Figure 4 and mirror 15, it is desirable that the same may be mounted upon any convenient mechanism for causing the mirror 15 to scan the transparency 16 without leaving any discernible pattern thereon. For this purpose, there is recommended a mechanism which will cause the mirror (1) to rotate on an axis (A axis) which is vertical and parallel to the transparency to sweep the beam across the transparency, (2) at the end of each sweep to move on an axis (B axis) horizontal and parallel to the transparency so that the next sweep will follow an adjacent and parallel path to the preceding sweep and thus cover the entire transparency by a series of adjacent parallel paths, and (3), after covering the transparency once by said series of adjacent and parallel paths to shift on an axis (C axis) perpendicular to the transparency at or near the center thereof and in such position repeat the series of parallel sweeps. This procedure is repeated through several positions of said mirror on its C axis. Thus, by moving at a rapid speed and covering the entire separation negative by many series of parallel sweeps and in many positions on the C axis, the scaning beam will produce a criss-cross pattern which will soon smooth out into a uniformly exposed negative.

Obviously, the mirror could be mounted as shown in Figure 4 and conceivably operated by hand but, for purposes of accuracy and convenience, it is better done mechanically. However, since a convenient mechanism for effecting this result can be readily designed by any skilled mechanic to meet the purpose as desired, no details are here given.

Also, it is obvious that this apparatus is not limited to the use of mirrors, for lenses, mutually rotating and transmitting light through themselves, may also be used for scanning purposes. An example of such a device is found in the patent to Dimmick, issued November 26, 1940, under No. 2,222,937.

It is obviously desirable to place the entire above described apparatus in a light-tight box arranged to permit ready access to the electrical adjusting dials, the filter holders and the transparency and negative holders.

The operation of the device has already been somewhat indicated by the description of its construction, but before going further into the process herein involved, it may be desirable in the interest of clarity to note briefly in recapitulation the operating relationships thereof.

With a transparency inserted at 16 and a separation negative to be exposed inserted at 20, the mechanism is started. Light emanating from source 2, the exposing beam, is concentrated as vertically polarized light at aperture 12 as above described. Light emanating from light source 42, the pilot beam, is horizontally polarized by Nichol prism 45 and concentrated as horizontally polarized light at aperture 12 as above described. From here both of the light beams pass on coinciding axes through lens 14 and strike mirror 15 to be reflected and focused in a small and bright spot upon transparency 16. The rays passing through the transparency acquire therefrom certain characteristics of color and intensity, and are by the particles in the image record refracted into all directions. Some of the rays now strike screen 35 and only the vertically polarized ones thereof pass through to fall upon and expose negtaive 20. The horizontally polarized rays from the pilot beam are barred. Others of such rays will proceed in the direction of apertures 23—a and 24—a where the vertically polarized ones from the exposing beam are barred by screens 36 and 37, respectively, but the horizontally polarized ones from the pilot beam pass through to exite the photoelectric cells 23 and 24.

Accordingly, as the photoelectric cells are excited, the current flowing out from the pre-amplifiers 25 and 26 is inversely modulated in exact proportion to a function of the density of the portion of transparency 16 which is at that instant being illuminated. Obviously, by placing selected color filters 38 and 39 before apertures 23—a and 24—a, the current flowing out of said pre-amplifiers can be made delicately responsive to the density of any selected color characteristic of the transparency. These currents are then joined for joint amplification by amplifier 31 to a point sufficient to control the Kerr cell. By control 34 a selected basic potential may at all times be placed across terminals 32 and thus a basic exposing beam always is available.

Thus when the horizontally polarized pilot beam passes through a light (low density) portion of the transparency 16, it affects strongly the cells 23 and 24, thus making the voltage flowing out of pre-amplifiers 25 and 26 very small, thus determining the potential on terminals 32 at a point only slightly above the basic potential imposed by control 34. This constricts the ellipse of the elliptical polarization in the Kerr cell and makes the light flowing out therefrom only a little above that effected by the basic potential from 33. Hence the vertically polarized exposing beam coming out from prism 8 and flowing through the lens 19 to expose the negative 20 is fixed in intensity near the basic amount. Now assume that the pilot beam strikes a dark spot on the transparency. It is reduced in intensity and the excitation of the photoelectric cell is reduced. Hence the current flowing out from the pre-amplifiers is increased; the potential across the Kerr cell is increased; the light flowing through the Kerr cell is increased; and the strength of the exposing beam striking the said dark spot on the transparency is increased.

Having described a usable means for carrying out my process in sufficient detail for the same to be constructed by any skilled mechanic, I will now explain more at length the occasions for and the manner of practicing my process. As above noted, the inks used in printing are not responsive to light in the same manner as are the dyes used in the transparency. This is particularly true in the case of blue, but is true throughout. In addition, it is often desirable in many types of commercial illustration, to build up or build down particular colors and particular intensities in order to secure certain effects which may not be readily obtained photographically, for example: emphasizing the coolness of a summer resort by intensifying the blue and green in the illustration of the advertising literature, or emphasizing the warmth of furniture by intensifying the reds and yellows in the advertising literature.

Assume, then, that there is to be made a normal and lifelike four color picture, but the best available inks for the material upon which the picture is to be printed provide a blue that is only 70% reflective, and, further, that because of the severity of the highlights in the picture, it is desirable to reduce the density range 40% in order to secure a more smooth result. The blues are at the present time strengthened in relative appearance by weaking the reds that are in the same areas of the picture. This has been done by binding a weak positive made from the red filter into register with the usual green filter negative and exposing through both of these in making the red printer (green filter) positive. Thus where an area is mostly blue or green, the percentage of red is reduced; but where an area is mostly red, it is less affected and but little red is removed. In similar manner, by present processes, excessive highlights are reduced by binding into register with the gray negative a weakly developed gray positive, by which the density range is reduced any desired degree. In these processes, the amount and extent of correction has been thoroughly worked out so that it is here desired only to effect the ultimate ends by different processes which can more accurately reach the known desirable ends.

Red printing negative

Turning now to the making of the red printing (green filter) negative, the transparency is placed in position at 16 in frame 17 and the separation negative for the red printer plate is placed in position at 20 in frame 17—a. A standard green filter, as used in making any separation negative is placed in position at 18. A red filter is placed is placed in position at 38 in front of photoelectric cell 23. A yellow filter, usually a K—2 filter, is placed in position at 39 in front of photoelectric cell 24.

Returning now to the fact that it is desired to reduce the reds, particularly those which are in the blue portions of the picture, to 70% of their value, and to reduce the density range (affecting principally the highlights) to 60% of the original density, I set the control 34 at a sufficient voltage (above the minimum of 375 volts effective for the Kerr cell) to permit a basic 60 units (said units being arbitrarily assumed for illustrative purposes) of light to come out of prism 8. Then I set control 30 of amplifier 28 (density correcting) so that when the photoelectric cell 24 is not activated, this circuit will add enough voltage across the terminals 32 to permit 10 more units of light to come through the light valve. Then I set control 29 of amplifier 27 (color control) so that when the photoelectric cell 23 is not activated this circuit will add enough voltage across the terminals 32 to permit 30 more units of light to come through the light valve. This makes 100 units of light, or a normal beam, coming out of the light valve. Thus the red will be modulated 30% of the normal intensity, and the red portions of the density range will be modulated another 10 units or a total of 40% of the whole. Obviously the density modulation must be carried out through the other colors as well to secure a 40% modulation of the gray scale.

Horizontally polarized light of a steady intensity now comes out of tube 41 as a pilot beam, as detailed above, and is refracted by prism 46 and directed through lens 11 and aperture 13 to make a bright spot of vertically polarized light at aperture 13. This passes through lens 14 and is directed by mirror 15 onto transparency 16 to illuminate a small spot thereon. Assume that this spot is part of a water scene and hence appears to the eye as pure blue. The color, however, is probably more truthfully analyzed as containing a portion of red which must be toned out in order to give the weak blue ink an opportunity to appear to the eye as the same color as the scene in nature. When the white pilot beam passed through this spot on the transparency, it becomes filtered so that it contains only blue and a little red light. It is, of course, horizontally polarized and hence will be entirely blocked by screen 35 but will pass screens 36 and 37.

Now, considering only the color correcting operation and ignoring the density correcting action, the pilot beam passes red filter 38 and has all of the blue removed therefrom and hence strikes photoelectric cell 23 as a very weak beam. This permits the current flowing from pre-amplifier 25 to continue almost undiminished. Thus the basic 60 units plus 10 units from the density correcting mechanism plus almost a full 30 units of light from said color correcting mechanism, comes through the light valve, and accordingly permits substantially the full normal (ignoring the density correction) intensity of light in the areas where the red is weak. This is the same thing that is done by a mask made as a weak positive from a negative made through a red filter. Now let the pilot beam swing onto a section of the transparency 16 which is entirely red. The photoelectric cell 23 is now fully activated and the voltage emanating from the pre-amplifier 25 reduced to zero which makes the voltage at 32 (again ignoring the intensity correcting circuit) the basic amount, or the amount necessary to permit only the basic 60 units plus 10 units of light from the density correcting mechanism to come out of the light valve, and since this totals only 70 units, the exposure in the pure red areas is reduced, subject, perhaps, to further correction for the density range.

Thus, relative to the weak red area above mentioned, where the exposure was of 100 units, the exposing beam is here reduced in intensity to 70 units. This reduces the exposure of the negative in the red areas and correspondingly darkens the positives in these areas. Relatively speaking then, if the exposing beam strength is adjusted to keep the average density of the positive in the red areas standard, the weak red areas (the blue and green) will be lightened. This is the desired effect in the red (or magenta) printer and is the same as secured by masking.

Now considering the action of the density correction circuit. Since the operation is upon the gray scale, all colors are equally affected and are to be lessened in intensity range by 40%. A light yellow, preferably K-2, filter is desirable at 39, but is concerned with correction for color characteristics of the light sources 2 and 42 and if they possess a perfect color spectrum this filter may be omitted. It is obvious that since the density range of the red printer (green filter) negative has already been reduced 30% by the above detailed process, it is desirable to affect it only another 10% to bring the total density range of the final positive down to 60% of the original. Thus the control at 30 is set to add only 10 units of light to the basic light strength of 60 units, but it should be noted that this is in addition to the 30 units added by control 29. With this setting, in a dark portion of the transparency, as a shadow in the picture, the photoelectric cell 24 is not activated and potential sufficient for the full 10 units, or nearly so, flows out from pre-amplifier 26. Now assume that the pilot beam strikes a highlight in the picture. The photoelectric cell 24 is now activated at its maximum and the said potential from pre-amplifier 26 is cut off. This reduces the effective potential at terminals 32 and accordingly reduces the light coming out of the light valve by 10 units. In this highlight, the pilot beam will also activate the photoelectric cell 23 at its maximum (so far as the red content therein is concerned) and in the manner detailed above cut down the light emitted from the light valve by 30 units. Thus at this highlight in the picture, the exposing beam is reduced in strength from 100 units to 60 units and the contrast of the negative as manifested in this highlight is accordingly reduced.

Obviously, however, if there is some red in this highlight, but no blue or green, the reduction in exposing beam intensity will be the full 40 units for the blue and green printing negatives, but less than that for the red printing negative in order to correct the color intensity of the said red printing negative as above explained.

*Blue printing negative*

Now turning to the making of the blue printing negative, we find that this one is not in the present practice usually corrected for color although it must be corrected for density range (to eliminate extreme highlights). However, by means of the herein disclosed process and apparatus, it is possible to super-saturate the blue areas of the printer in order to secure an intensification of the blue in those portions. Thus it is possible to effect the correction by means other than solely by reducing the red intensity, as in the present masking technique. This is particularly desirable where the transparency is already low on contrast, so that further reduction thereof would be undesirable. However, if any intensification of the blue is practiced as here suggested, the quantitative relationships indicated above for the red printer must be varied accordingly, for those were assumed upon the basis of no alteration of the blues.

Assuming first that no intensity changes in the blue is desired excepting that used for general density range correction, the amplifier control 29 is turned to shut off this circuit entirely, the light yellow filter is placed at 39 and the control 30 is set to add 40 units to the basic exposing beam strength of 60. The usual red filter is placed at 18. Thus there is no variation for color intensities, but highlights are cut off to the extent of the full 40% in the same manner as indicated above for the red printer. Here note, however, that if the highlight contains any blue color, the reduction of intensity on this blue printer negative will be modified accordingly.

Assuming now that we desire to intensify the blue areas, we place the same red filter at 18, a green filter at 38 and the yellow K-2 filter at 39. Thus in an area which is predominantly blue, the blue rays in the pilot beam coming through the green filter at 38 will excite the photoelectric cell and cause it to reduce the intensity of the exposing beam in the manner above described. Thus the negative is lightened in the blue areas which will cause the positive to be heavier in the same blue areas. When a red area is reached by the pilot beam the light passing the green filter at 38 is lessened and accordingly the light emanating from the light valve (the exposing beam) returns to normal; this makes the negative normal and hence the positive is normal in the red areas. Thus the positive for the blue printer may be made heavier in the blue areas and kept normal in the red areas, which is the desirable end above mentioned.

Yellow printer negative

For this negative, a blue filter of standard form is placed at 18, the above mentioned yellow filter left at 39 and the color correcting circuit including amplifier 27 shut off. Since the blue waves from the filter at 18 are short and do not ordinarily penetrate as deeply into the photographic emulsion as do the green and red waves, the negative has a tendency to appear flat and lacking in contrast. Hence, the present practice for correcting this feature consists principally in giving it extra developing time. This, like other details of the present corrective practice, is dependent too much upon the skill with which the operator guesses. With the presently disclosed process and apparatus, the color circuit, namely, that including photoelectric cell 23 and amplifier 27, is shut off and the contrast correcting circuit adjusted to a lower production of potential than in the other cases.

Thus, to present an example in terms comparable to the above examples of operation, assume that we have a transparency which, as above, requires 40% reduction of contrast over the general area (40% reduction of density range in the gray scale), we would on this blue filter negative make the reduction only, for example, 25%. Thus, with the potential as controlled at 34 still set to permit 60 units of light to come out of the light valve, we set the amplifier 28 to add this time only 25 units thereto instead of 40. Thus, this negative will be exposed in the same basic amount as in the other areas but it will be corrected in this case to a less extent, which change secures more contrast relative to the other separation negatives and hence permits the flat effect caused by the above mentioned characteristics of the blue light waves as described to be eliminated. Since the degree of lessening in contrast in making the blue filter negative is well known for the various negative materials, the correct setting of the control 30 will be precisely determinable and the correction definite and not subject solely to the guess of the operator.

Black printing negative

The black printing negative in present practice may or may not be used, depending upon the precision desired in the finished product. If used, however, we again have the problem of keeping the blue areas bright and lifelike, for if black is printed into those areas, the weak blue inks cannot overcome the black ink and these areas are lifeless and dull. This correction follows the same principles followed above and uses the usual light yellow filter over the photoelectric cell 24 for the contrast correction, a dark yellow filter over cell 23, and a light yellow filter at 18. This latter is for the same purpose and subject to the same conditions as at 39, namely, to correct color conditions of the light sources and may be eliminated if the source 2 produces a perfect spectrum.

With the dark yellow filter over cell 23, when the pilot beam strikes the red and green areas, the pilot beam light passes the filter at 38 and excites cell 23 to keep the strength of the exposing beam only a little above a basic 70 light units (for the purpose of this explanation, we place the 10 units controlled by cell 24 together with the actual basic of 60 units used elsewhere herein) which produces a black printer negative of corresponding density in the red and green areas. When, however, the pilot beam strikes a blue area, it is stopped by the yellow filter at 38 and the excitation of cell 23 goes down. This, as detailed above, increases the light emitted from the light valve as the exposing beam and hence darkens relatively the areas in the negative corresponding to the blue areas. Thus the portions of the black printer positive which correspond to the blue areas of the transparency 16 are lightened.

Correction for contrast proceeds as for the other negatives and, hence, need not be here repeated.

Summary

We have, therefore, a process and apparatus for correcting both the color characteristics and the contrast in color separation negatives which is precise and definite in operation, which makes a fully corrected negative in one operation and which eliminates the guesswork inherent in the presently used systems of masking for this purpose.

As explained above in detail the process comprises directing a small and steady beam of light as a pilot beam upon successive parts of a colored transparency, analyzing the color characteristics of successive spots on a colored transparency with particular reference to the intensity of any selected color by causing light originating with said pilot beam and emanating from the spot on said transparency to pass through a color selecting means and thence to fall upon a light sensitive means, effecting control by said light sensitive means of a light valve which controls the intensity of an exposing beam of light, causing said exposing beam to fall upon said transparency simultaneously with said pilot beam and to pass through the same, thence to pass through a color selecting means and to fall upon the negative to be exposed, and moving both of said beams of light together from place to place to cover the entire transparency smoothly and without formation of pattern.

In the apparatus described, a narrow pilot beam and a narrow exposing beam are made separable by polarizing the one vertically and the other horizontally and placing selecting screens over the respective places to which they are desired to go. Standard photoelectric cells form the light sensitive means and standard amplifiers operatively connect them with a Kerr cell which, together with two Nichol prisms set at right angles to each other, forms a light valve controlling the exposing beam. Both pilot beam and exposing beam are projected together onto a scanning device which moves to direct both beams simultaneously upon the transparency and directs both beams in a path which covers the entire transparency. The beams pass through the transparency and acquire certain color and intensity characteristics therefrom, and then one beam is directed onto the separation negative being made and the other beam is directed onto the photoelectric cells which control the Kerr cell. The whole of the described apparatus is either used in a dark room, or is preferably placed in a light tight box which is arranged to permit access from the outside thereof to the various essential parts thereof.

Method and apparatus of Figure 3

Turning now to the form of apparatus shown in Figure 3, we have a mechanism and method for effecting the same purpose as the mechanism and method above described and which in most of its major provisions is the same as that above described. However, this figure and the description hereinafter following embody certain modifications which require for the full support of claims broad enough to cover the full scope of my invention that this modification be disclosed and described in some detail.

Upon reference to Figure 3, it will be seen that in this form the assembly contained within the tube 1 is exactly the same as that shown in Figure 1, with the exception, however, that the mechanism for furnishing the pilot beam, namely, members 41 to 46 and 46—a have been omitted. Mirror 15 is the same and in this form also is constructed to move on three mutually perpendicular axes in the same manner as above described for the form shown in Figure 1. The analyzing and exposing portion of the mechanism likewise is substantially the same as in the form shown in Figure 1 and is shown diagrammatically in Figure 3. It omits however, from the form shown in Figure 1, the polarizing filters 35, 36 and 37.

In the electrical circuit, also, all elements are the same and connected the same as in the form shown in Figure 1, excepting, however, that there is interposed in the circuit variable resistances 50 and 51. These resistances may advantageously be placed between intermediate amplifier 28 and final amplifier 31 and also between intermediate amplifier 27 and final amplifier 31 as shown. As it will appear to one skilled in the art upon a full understanding of the method of operation of this particular form of my invention, these resistances may also be placed between pre-amplifier 26 and intermediate amplifier 28 and also between pre-amplifier 25 and intermediate amplifier 27.

Inasmuch as all parts, excepting those above specifically mentioned, are the same in the two forms shown in Figures 1 and 3, the same reference numbers have been used for both figures and it is believed that the description above given for the form shown in Figure 1 will be substantially sufficient to illustrate fully the form shown in Figure 3 and, excepting as hereinafter appearing, reference is hereby made to the same for that purpose.

As in the form above described, the particles in the image record of transparency 16 cause the rays of light falling upon it to be dispersed in all directions so that the light passing through transparency 16 will fall upon filter 18 and filters 38 and 39. The light passing through filter 18 will fall upon lens 19 and be focused thereby upon negative 20. The light falling upon filter 38 will pass through the same and upon photoelectric cell 23 and the light falling upon filter 39 will pass through the same to fall upon photoelectric cell 24.

Photoelectric cell 23 is operatively associated with a standard pre-amplifier 25 in any standard manner which may be found to be conventional in this sort of construction. At 27, there appears an intermediate amplifier of any type which is suitable for modulating the final amplifier of a Kerr cell. It is provided with an adjusting dial 29 which may be arranged to read upon one or more dials as 29—a and 29—b which are calibrated for the various colors and conditions under which it is desired to use this apparatus. A source of steady direct current is provided at 27—a and connected to the amplifier 27 in a manner to include the circuit of photoelectric cell 23. A connection between photoelectric cell 23 and pre-amplifier 25 is any one of several conventional and well known types of arrangement by which the output of pre-amplifier 25 will vary inversely as the excitation of photoelectric cell 23. As stated, this connection may be made in one of several known manners but it is suggested that satisfactory means may be found by connecting the photoelectric cell 23 with reverse polarity to pre-amplifier 25. Another satisfactory means of making this connection is by connecting photoelectric cell 23 in shunt around the amplifying section of pre-amplifier 25 in such a manner that increased activity of the cell 23 will permit a greater current flow through its circuit and hence decrease the current flowing through the amplifying tube of said pre-amplifier 25. Pre-amplifier 25 is then connected to amplifier 27 which is in turn connected through a variable resistance 51 to the final amplifier 31.

Photoelectric cell 24 is connected closely and operatively with a standard pre-amplifier 26 and the latter is connected to intermediate amplifier 28. At 28—a is indicated a source of steady direct current which is operatively connected to amplifier 28, which latter is also provided with knob 30 and one or more dials as 30—a and 30—b which may be calibrated so that knob 30 will indicate thereon various setting of the amplifier in accordance with the particular color then under consideration and the type and use then desired. Photoelectric cell 24 is connected with amplifier 26 in a manner similar to the connection above discussed between the cell 23 and pre-amplifier 25 so that the output of pre-amplifier 26 will vary inversely to the activity of photoelectric cell 24. Amplifier 28 is connected through variable resistance 50 to final amplifier 31 where it joins with the circuit from amplifier 27 to modulate jointly the final amplifier 31. Amplifier 31 is then connected to the terminals 32 of Kerr cell 7.

A source of adjustable supplementary potential is provided at 33 in the same manner as in the form of Figure 1. It will be obvious, however, to one skilled in the art that in either of these forms the same result may be effected by introducing a controlled supplementary potential upon the grid of the amplifier tube of amplifiers 27 and 28.

The operation of this form of the device is, however, somewhat different than in the above described form. In the manner above described for the form of Figure 1, a plane polarized beam of light is formed at the aperture 12 in mask 13 and is directed by lens 14 upon mirror 15, by which the same is reflected onto transparency 16. As in the above form described the relative spacing of lens 14, mirror 15 and transparency 16 are such with respect to the focal length of lens 14 that the image of aperture 12 is caused by said lens 14 to focus upon transparency 16 as a real image thereon.

Now for the moment confining our attention to the circuit involving the photoelectric cell 23, we find that when the cell is only slightly energized the current flowing out of pre-amplifier 25 is at a maximum. Hence, for any fixed setting of variable resistance 51 or supplementary source 33, the potential being imposed across the terminals of Kerr cell 32 will be at a maximum. This will permit a maximum amount of light to pass through the light valve of which the Kerr cell is a part and thence through the rest of the apparatus and finally back upon the photoelectric cell 23 and thus tend to increase the excitation of the same. This increased excitation of the photoelectric cell 23 would tend to decrease the current flowing through the amplifying system and thus the current imposed across the terminals of the Kerr cell and thus decrease the light being permitted to pass through the light valve. The reactions being of light and electricity, the system will obviously stabilize these opposing tendencies, for all practical purposes, instantaneously and the point of stabilization will be determined by the density of transparency 16. It will be apparent also that the point of stabilization will be determined in relationship to the density of the said transparency 16 by adjustment of the variable resistances 50 and 51.

The manner of using this form is substantially the same as for the form above described. A basic potential is placed across the terminals 32 of the Kerr cell by the source 33 and adjusted to provide proper light transmitting characteristics in the Kerr cell, then the resistances at 50 and 51 are adjusted to provide additional potentials across the terminals 32 of the Kerr cell according to the amount of modulation desired for the particular situation. As in the form above described, the one circuit, as that connected with resistance 50, is used for modulating color values whereas the other circuit, as that connected with resistance 51, is used for modulating gray scales densities. The further details of using my device for practicing the method of color correction above indicated follows the same general lines as above explained in detail for the form of the device as shown in Figure 1 and hence it is not believed that further explanation of this particular form is either necessary or desirable.

*Summary of both forms*

In summary, it would be proper to say that whereas the methods embodied by the form shown in Figure 1 comprises analyzing the transparency with one beam of light and exposing the negative with an entirely separate beam of light, the system illustrated by Fig. 3 comprises both analyzing and exposing by the same beam of light and causing adjustments in the extent of modulation effected, by imposing variable means in the analyzing and modulating circuit in order to vary at will the balancing relationships of the light circuit and the electrical circuit. Among other things, it might properly be said that the first described system is more precise and accurate in its operation whereas the second described system requires less equipment and avoids the problems of keeping two beams of light co-incident in position but separated in action.

In both systems, the operation of the mirror 15 in its repeated tracing of criss-cross patterns of light onto the transparency 16 is the same.

*Possible variations*

Obviously, also, both forms are subject to many variations both in the method of operation and in the device itself, some of which variations have been suggested at many points throughout the foregoing specification and, hence, need no repetition here. It should, however, be emphasized that this invention is a broad advance in the art both as to method and as to apparatus and, hence, the claims, unless their terms are specifically limited otherwise, should be entitled to a broad construction.

By way of example only, and not with any thought of suggesting such variations inclusively, the process might be changed as elsewhere suggested to build up the weak blue color instead of toning down the other colors. Also in the same manner, other colors may be built up or toned down to give different effects to the final picture. The apparatus might be varied in innumerable ways, of which the following are examples only and are neither intended as nor thought to be inclusive: set the photoelectric cells to control the potential output directly instead of inversely and then turn the Nichol prisms to the same plane so that an increased potential will reduce the light output by spreading some of the light into planes outside of the plane of prism 8; use any of various available forms of cathode ray tubes for the light valve providing only that they be properly corrected for spectral characteristics; operate the device in a darkroom or build it into a box which is light-tight but having openings for inserting and removing the various materials and for reaching the controls; using any of many conceivable means for driving the mirror in the manner described or in any other manner which will cover the transparency smoothly and without resulting pattern or even mounting the same on a universal joint and operating by hand; using other types of available scanning devices; varying the nature of the respective light sources; varying the focal lengths of the respective lenses; separating the pilot beam and the exposing beam in space instead of by polarization; and many other variations of similar nature too numerous to detail further. Except as otherwise specifically limited in the claims, these variations will all fall within the scope of my invention and will be included in the appended claims. My invention herein disclosed is, as I understand the nature of the art at the present time, a far reaching reformation thereof and a wide departure from established practices, and hence the claims should be interpreted accordingly, excepting only as they may be by their own terms specifically limited.

Having thus disclosed and described my invention, both as to process and as to apparatus, I claim:

1. The process of making a color corrected color separation negative from a transparency comprising: directing a narrow pilot beam of light polarized in one plane from a constant source onto a transparency; directing a narrow exposing beam of light controllable in intensity and polarized in a plane at a wide angle to the plane of polarization of said pilot beam from a source onto the said transparency; causing both of said beams to scan all parts of said transparency coincidentally and accordingly to cause light waves which are polarized in two different planes to leave the side of said transparency opposite that from which the original beams come and having color and intensity characteristics corresponding to the portion of the transparency at that instant being illuminated by said beams, further controlling said exposing beam to cause it to fall upon said transparency with a selected basic intensity plus two determinable additionally imposed intensities; permitting light from the exposing beam to pass through a selected filter and thence to fall upon the separation negative to expose the same; permitting light from the pilot beam to pass one part through a light filter capable of passing only the color for which correction is desired and falling thence upon a light sensitive means and another part upon another light sensitive means; to control by means of the first named light sensitive means one of said determinable additionally imposed intensities in said exposing beam and to adjust the same quantitatively according to the amount of color correction desired upon said separation negative and to control by means of the second named light sensitive means the other of said determinable additionally imposed intensities in said exposing beam and to adjust the same quantitatively according to the correction in density range desired in said separation negative, by which to cause a variation in the intensity of said exposing beam according to the type and magnitude of correction desired; whereby the exposure of the separation negative in areas containing selected colors in varying intensities may be correspondingly reduced or increased according to the desire of the operator and simultaneously there may be made density range correction for all colors and the correction may be precise and exact and eliminate indefinite and time-consuming masking procedure.

2. The process of making a color corrected separation negative from a transparency comprising: directing a narrow pilot beam of light from a constant source onto the colored transparency from which said separation negative is to be made; directing a narrow exposing beam of light of controllable intensity from a source onto said transparency; causing both of said beams simultaneously to scan the entirety of said transparency and to illuminate very small and identical portions of the transparency at any particular instant; providing said exposing beam with a selected basic intensity and providing it further with two selectively variable additionally imposed intensities; causing the light from the pilot beam which is transmitted through said transparency and being only of the color desired to be corrected to fall upon a light sensitive means and using the reactions of said light sensitive means to control positively but inversely one of the above named additionally imposed intensities of said exposing beam to control color correction in said separation negative; causing other light from the pilot beam which is transmitted through said transparency and being of all colors present in the portion of said transparency then being illuminated to fall upon another light sensitive means and using the reactions of said light sensitive means to control positively but inversely the other of the above named additionally imposed intensities of said exposing beam to control density range correction in said separation negative; adjusting such control quantitatively according to the degree of correction of color and density range desirable in the particular separation negative for the purpose of the final picture; causing light passing through the transparency but which originates solely in the exposing beam and is of the color complementary to that which the said separation negative is intended to print to fall upon said separation negative and expose the same.

3. The process of making a properly corrected color separation negative from a transparency comprising: directing a narrow pilot beam of light onto said transparency and keeping said beam of light of constant intensity; directing a narrow exposing beam of light of selectively variable intensity onto said transparency; causing said beams simultaneously to scan all parts of said transparency and to illuminate very small and identical areas at any one time; causing light which passes through said transparency, which originates solely with said pilot beam and which is only of the color for which correction is desired to fall upon a light sensitive means; using the reaction of said light sensitive means to control the intensity of said exposing beam in a manner positively but inversely responsive to the activation of said light sensitive means; causing light passing through said transparency which originates solely with said exposing beam and which is only of the color complementary to that for which the said separation negative is intended to print to fall upon said separation negative and expose the same; whereby said negative will be darkened in the portions of said transparency having colors which are desired to be lightened in the positive print.

4. The process of making a properly corrected color separation negative from a transparency comprising: directing a narrow pilot beam of light onto said transparency and keeping said beam of light of constant intensity; directing a narrow exposing beam of light of selectively variable intensity onto said transparency; causing said beams simultaneously to scan all parts of said transparency and to illuminate a very small area at any one time; causing light which passes through the transparency, which originates solely with the pilot beam and which is of color characteristic selected according to the color characteristics desired in the said separation negative, to fall upon light sensitive means; using the reaction of said light sensitive means to control the intensity of said exposing beam in a manner positively responsive to the activation of said light sensitive means; causing light passing through said transparency which originates solely with said exposing beam and which is only of the color complementary to that for which the said separation negative is intended to print to fall upon said separation negative and expose the same; whereby said negative will be lightened in the portions thereof corresponding to those portions of said transparency having colors which are desired to be darkened in the positive print.

5. The process of making a properly corrected color separation negative comprising: causing a narrow pilot beam of light of steady intensity to fall upon successive small portions of the transparency from which said negative is to be made; permitting light originating solely from said pilot beam and having the color and intensity characteristics of the small portion of said transparency as illuminated at any one instant to fall upon a light sensitive means; utilizing the reaction of said light sensitive means to control the intensity of an exposing beam of light; causing said exposing beam of light to strike the same portion of the transparency as does the said pilot beam at any given moment; causing light originating solely with said exposing beam to pass through said transparency to acquire the intensity and color characteristics of said portion of said transparency and thence to fall upon said negative and expose the same in a portion corresponding to the spot of the transparency then being illuminated.

6. The method of preparing properly corrected color separation negatives comprising: causing a beam of light to scan a transparency, analyzing the respective color and intensity characteristics of the light emanating from said transparency by refraction of said beam and causing an electrical potential to be responsive in magnitude to said characteristics of said light emanating from said transparency, utilizing such variations in electrical potential controllably to vary responsively thereto the intensity of said beam of light at a point prior to its striking said transparency, and causing other light emanating by refraction from said transparency to fall directly upon a sensitized material to expose the same.

7. Apparatus for the preparation of a properly corrected color separation negative from a transparency including in combination: a light source; a light valve operatively associated therewith and adaptable for substantially instantaneous variation in light transmitting capacity according to the variation of an associated electrical potential; means effective to polarize the beam from said light source in a selected plane to provide an exposing beam; another light source and means effective to polarize the beam therefrom in a selected plane to provide a pilot beam; means adapted to receive the light beams from both of said light sources and to emit them together on coinciding axes of transmission; means including a lens to direct said light beams combined as aforesaid onto a transparency and means associated therewith effective to cause said light beams to scan said transparency to cover the entirety thereof; means positioned to receive light emanating from said transparency and effective to select therefrom light polarized in the plane of said exposing beam and other means associated therewith including a light filter and a lens effective to select a color of said light and to direct the image in the color as selected of the portion of the transparency illuminated at that instant onto the negative to be exposed; other means positioned to receive light emanating from said transparency and effective to select therefrom light polarized in the plane of said pilot beam and means associated therewith including a color filter and a light sensitive means adapted to receive said light in the color as selected and further adapted to react thereto to provide an electrical potential of magnitude responsive to the intensity of said selected light received by said light sensitive means; means effective to controllably amplify said potential and means effective to operatively apply said potential to said light valve; means effective to operatively apply an independently controllable potential to the said light valve; whereby variations in the intensity of light originating with said pilot beam and emanating from said transparency will cause immediate and controllable variations in the intensity of the exposing beam.

8. In apparatus for preparing a photographic negative from a transparency means for correcting color therein including: means adapted to direct a narrow pilot beam of light polarized in one plane onto said transparency; means adapted to direct a narrow exposing beam of light polarized in a different plane onto said transparency; means adapted to cause said beams of light to fall onto the same portions of said transparency at any one instant and to cause said beams to scan said transparency to illuminate by successive portions thereof the entirety of same; a light valve interposed in the path of said exposing beam and effective to vary instantly in response to electrical stimulation the intensity of said exposing beam; means operable to select by its polarization characteristic light emanating from said transparency and originating from said exposing beam and to direct same directly onto said negative to expose the portion of same corresponding to the portion of the transparency at a particular instant being illuminated; means operable to select light emanating from said transparency and originating from said pilot beam and operable to create an electrical potential variable in response to the intensity of light so received; means effective to apply said electrical potential to said light valve as its operating stimulus; whereby said exposing beam will be varied in intensity according to selected characteristics of said transparency.

9. In apparatus for preparing a photographic negative from a transparency: means operable to secure selected color intensity correction therein including a light source for a pilot beam, means adapted to polarize same in a selected plane, means adapted to cause the same to scan by successive small units all parts of said transparency; a light source for an exposing beam; a light valve associated therewith and operable to vary according to electrical stimulation the intensity of said exposing beam; means effective to polarize same in a selected plane and means operable to cause the same to scan by successive small units all parts of said transparency; selective means operable to direct light emanating from said transparency and originating from said exposing beam onto said negative to expose the same; selective means operable to direct light emanating from said transparency and originating from said pilot beam onto light sensitive means to create therein electrical stimuli responsive to selected light characteristics of said transparency as the same affect said pilot beam;

means effective to impose operatively said electrical stimuli upon said light valve whereby the intensity of said exposing beam will vary in response to said electrical stimuli.

10. In apparatus for preparing a photographic negative from a transparency, means effective to vary the color density characteristics of said negative from those of said transparency in a controllable relationship, including: means adapted to direct a beam of light upon said transparency to constitute a pilot beam; means adapted to direct a beam of light upon said transparency to constitute an exposing beam; means adapted to cause both of said beams to illuminate only a small portion of said transparency at any one time and to scan the entirety of said transparency; means adapted to receive light emanating from said transparency but only that originating from said exposing beam and further means associated therewith adapted to direct in color selective manner said light onto said negative to expose the same in a spot corresponding to and being an image of the spot of said transparency at any particular instant being illuminated; means adapted to receive light emanating from said transparency but only that originating from said pilot beam and further means associated therewith adapted to receive same in a color selected manner and in response thereto to produce an electrical potential whose magnitude will vary according to the intensity of the selected color in the portion of said transparency then being illuminated by said pilot beam; means adapted to respond to said electrical potential and in accordance therewith in controllable magnitude to vary the intensity of the said exposing beam.

11. In apparatus for preparing a properly corrected color separation negative from a transparency: a light source; a light valve operatively associated therewith and adaptable for substantially instantaneous variation in light transmitting capacity according to the variation of an associated electrical potential; means effective to polarize the beam from said light source in a selected plane; another light source and means effective to polarize the beam therefrom in a selected plane; means adapted to receive the light beams from both of said light sources and to emit them together on coinciding axes of transmission; means including a lens to direct said light beams combined as aforesaid onto said transparency and means associated therewith effective to cause said light beams to scan said transparency to cover the entirety thereof.

12. Apparatus for directing a beam of light onto a surface comprising: a light source; a light valve; means for directing light emitted from the light valve onto a transparency; light sensitive means located to receive light emanating from said transparency; means to associate operatively said light sensitive means with said light valve by which said light valve will respond in light transmitting characteristic according to the excitation of said light sensitive means; lens means to receive other light emanating from said transparency and to focus the same directly upon said surface.

13. Apparatus for directing a beam of light onto a surface comprising: a light source; a light valve interposed in the path of light emitted by said source and responsive in its light transmitting characteristics to an electrical potential; means operatively associated with said light valve by which light exiting therefrom will be directed onto a transparency and be refracted thereby into a plurality of directions without prismatic breakdown of said rays of light; light sensitive means located to receive said light as refracted from said transparency and pre-amplifying means associated therewith; an intermediate amplifying means operatively associated with said light sensitive means in a manner to be inversely responsive thereto; independent sources of electrical energy arranged to energize said pre-amplifying means and said intermediate amplifying means; a further amplifying means operatively associated with said intermediate amplifying means by means including a variable resistance therein; means by which a potential produced by said final amplifying means may be imposed onto the said light valve; means for imposing an independently controlled potential onto the terminals of said light valve; a lens arranged to receive other refracted light from said transparency and to focus the same onto said surface.

14. In an electrical optical system for reproducing a color photograph the combination of; means for causing a beam of light to scan the photograph, and photoelectric means for transforming into electrical modulations the variations in said scanning beam after the same has passed said photograph; means for modifying according to said electrical modulations the intensity of the original scanning beam at a point before it strikes said photograph; holding means adapted to accommodate a photosensitive panel; means for scanning said panel with light in synchronism with the scanning of the photograph wherein said light has been modified by said electrical modulations as above mentioned and has fallen upon said photograph for the reception of the color and intensity characteristics thereof.

PAUL CURRY.